No. 678,448. Patented July 16, 1901.
G. L. WILLIAMS.
MOUNTING FOR RIMLESS SPECTACLES OR EYEGLASSES.
(Application filed Mar. 9, 1900.)
(No Model.)

Witnesses
Saml R. Turner
Alice M. Turner

Inventor.
George L. Williams
By Fredk. Benjamin
Attorney

THE NORRIS PETERS CO., PHOTO-LITHO., WASHINGTON, D. C.

UNITED STATES PATENT OFFICE.

GEORGE L. WILLIAMS, OF CHICAGO, ILLINOIS, ASSIGNOR TO MONROE OPTICAL COMPANY, OF ROCHESTER, NEW YORK.

MOUNTING FOR RIMLESS SPECTACLES OR EYEGLASSES.

SPECIFICATION forming part of Letters Patent No. 678,448, dated July 16, 1901.

Application filed March 9, 1900. Serial No. 8,044. (No model.)

*To all whom it may concern:*

Be it known that I, GEORGE L. WILLIAMS, a citizen of the United States, residing at Chicago, in the county of Cook and State of Illinois, have invented new and useful Improvements in Mountings for Rimless Spectacles or Eyeglasses, of which the following is a specification.

My improvements are especially designed to provide a mounting that may be adjusted to lenses of different thicknesses, that will securely and firmly hold the lenses in position, that will present a neatly-finished appearance, that provides for adjustment of the pupilary distance, in which the bridge or spring, nose-guard holders, prongs, and one of the lens-engaging straps are struck from a single piece of metal, and in which but one screw is needed to secure the lens to the mounting.

My invention consists in the novel construction and arrangement of parts, as hereinafter set forth in detail and claimed and as illustrated in the accompanying drawings, which form a part of this application, in which—

Figure 1:
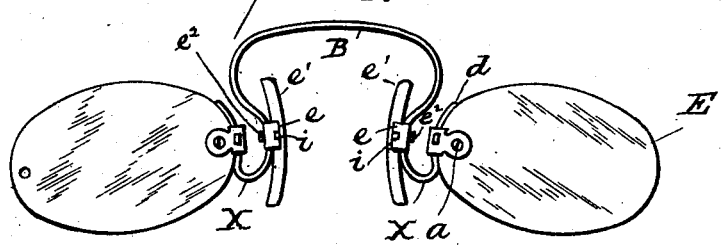
Figure 2:
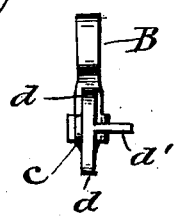
Figure 3:
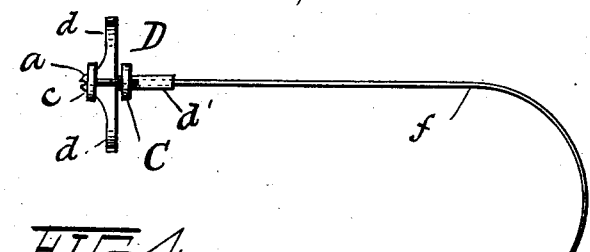
Figure 4:
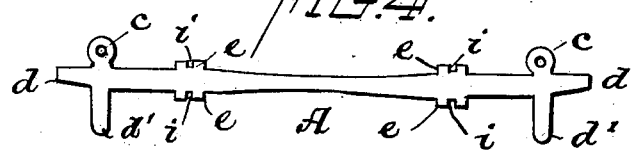
Figure 5:
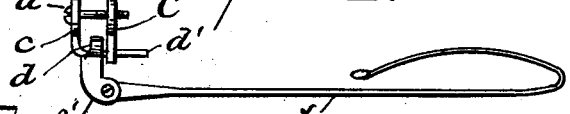
Figure 8:
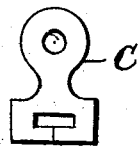
Figure 6:
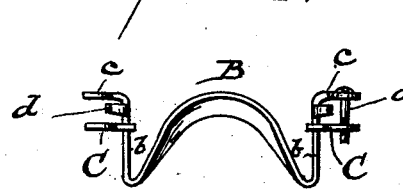
Figure 7:
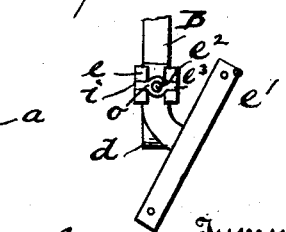

Figure 1 represents in elevation a pair of eyeglasses embodying my invention. Fig. 2 is a side view of a mounting for eyeglasses as formed from a single piece of metal. Fig. 3 is an elevation of a spectacle-mounting embodying my improvements. Fig. 4 is a plan view of the blank from which my improved mounting is chiefly constructed. Fig. 5 is a side view of a spectacle-mounting. Fig. 6 is an elevation of a portion of a spectacle-mounting, showing the bridge and lens-embracing straps, same being a slight modification of my invention. Fig. 7 is a detail showing the preferred form of attaching the nose-guards to the spring, and Fig. 8 is a detail of the adjustable strap forming a part of my invention.

Referring to the drawings, A represents a blank cut from a single piece of flat metal, from which are preferably formed the principal parts of my improved mounting, such parts comprising the bridge or spring B, the lugs $e\ e$ for embracing the nose-guards, the prongs $d$ for embracing the periphery of the lenses, the strap $c$ at one side of the lens, and the bar $d'$, which serves as a guide and support for the adjustable strap C.

In making a mounting for eyeglasses the strap or blank A, cut in the form shown in Fig. 4, is bent to form the spring B, then curved inwardly, then bent at $x\ x$, from which the end portions are bent upwardly, terminating in the ends $d$, which form the prongs for embracing the peripheries of the lenses. The lugs $e\ e$ are bent inwardly at right angles to the strap, and the latter is perforated between said lugs to permit the passage of the screw or rivet by which the nose-guards $e'$ are secured to the strap. The lugs $e\ e$ are notched, as at $i$, to receive shoulders on the threaded nut $o$, which fits between said lugs and receives the threaded ends of the pins $e^2$, which are inserted from the opposite side of the lugs, the nut being held from turning by the shoulders $e^3$, fitting in the notches $i$. In placing the screw-pins $e^2$ in position the portion of the strap A which carries the prongs $d$ and bar $d'$ is slightly bent or twisted to one side, thus affording easy access to the head of the screw-pin. It should also be noted that the facility with which said portion of the strap may be thus bent or twisted enables me to secure an offset spring at any desired angle to the lenses. It will be understood that the portion of the nose-guard fitting between the lugs $e\ e$ is perforated to permit the passage therethrough of the screw-pin $e^2$ in the usual manner. It will also be noted that the width of the bend at $x\ x$ determines the pupilary distance between the two lenses or between the nose of the wearer and either lens, thus providing simple means for regulating such pupilary distances. This function of my improved mounting, as well as that above named, wherein an offset spring is attained, are peculiar to the shape of the strap A when bent in the form shown in Fig. 1 and forms an important feature of my improvement.

The advantage of being able to apply the nose-guard-securing screw-pins $e^2$ from the lens side instead of from the inner or nose side of the spring is one that will be readily understood in the art. I am aware that this is not broadly new and that a square nut has been used between the lugs $e\ e$ for securing the end of the screw which fastens the nose-guards in position, so that I do not broadly claim such features.

Each lens E is held between the strap c, which, as above stated, is formed integrally with the bridge-piece B, and the strap C, which slides on and is supported by the arm d'. The strap C has formed therein an opening suitable for the attaching-screw a and has also formed therein a squared opening to receive the arm d', as clearly shown in Fig. 1. When the strap C is used with the form of mounting shown in Fig. 6, it is applied to the bar b by cutting through the shank portion of the strap, thus forming legs on either side of the square opening, which may be slightly twisted apart to admit the bar b, when they are closed and by welding or soldering secured together. The foregoing arrangement is clearly shown in Fig. 8.

When my invention is applied to a spectacle-mounting, as shown in Figs. 3 and 5, a lug f' is secured to the strap and the temple f hinged thereto in the usual manner, the parts c, d, d', and C remaining the same as in the other forms.

It will be noted that in my improved mounting a square or rectangular bearing is afforded for the strap C by the arm d', which prevents the turning of the strap about the bar and also neutralizes the tendency of the strap to twist from the strain on the mounting from the lens. When the straps have been adjusted to a lens, the projecting ends of the screw a and arm d' may be easily filed off flush with the strap C and finished in the usual manner, the position of said parts making them readily accessible for the finishing operations.

Having thus described my invention, what I claim, and desire to secure by Letters Patent, is—

1. An eyeglass and spectacle mounting composed of lens-embracing straps and strap guide-bars formed integrally, said guide-bars being rectangular in cross-section and extending at right angles to the plane of the lenses, and separate lens-straps having an opening therein fitting said guide-bars, whereby said straps are non-rotatably mounted on said guide-bars, as set forth.

2. An eyeglass and spectacle mounting composed of the strap A having notched nose-guard holders, prongs d, lens-embracing straps and guide-bars all integrally formed, separate lens-embracing straps non-rotatably mounted on said guide-bars, and means for securing said straps to lenses, as set forth.

In testimony whereof I have hereunto signed my name to this specification in the presence of two witnesses.

GEORGE L. WILLIAMS.

Witnesses:
M. R. SEYMOUR,
F. BENJAMIN.